US012620264B2

(12) United States Patent
Schwartz et al.

(10) Patent No.: US 12,620,264 B2
(45) Date of Patent: May 5, 2026

(54) ACTUATING A SYSTEM VIA LIVE PERSON IMAGE RECOGNITION

(71) Applicant: Ford Global Technologies, LLC, Dearborn, MI (US)

(72) Inventors: Jake Schwartz, Dearborn, MI (US); John Robert Van Wiemeersch, Novi, MI (US); Medha Karkare, Canton, MI (US); Ryan Edwin Hanson, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 465 days.

(21) Appl. No.: 18/303,078

(22) Filed: Apr. 19, 2023

(65) Prior Publication Data

US 2024/0355149 A1 Oct. 24, 2024

(51) Int. Cl.
| | |
|---|---|
| *G06V 40/40* | (2022.01) |
| *G06V 10/34* | (2022.01) |
| *G06V 40/16* | (2022.01) |

(52) U.S. Cl.
CPC .............. *G06V 40/45* (2022.01); *G06V 10/34* (2022.01); *G06V 40/172* (2022.01)

(58) Field of Classification Search
CPC ...... G06V 40/45; G06V 10/34; G06V 40/172; G06V 20/59; G06V 10/26; G06V 10/82; G06V 40/168; G06V 40/174; G06N 3/0464
See application file for complete search history.

(56) References Cited

U.S. PATENT DOCUMENTS

| | | | |
|---|---|---|---|
| 10,679,443 B2 | 6/2020 | Grigorov et al. | |
| 10,872,112 B2 | 12/2020 | Chang et al. | |
| 2004/0234109 A1* | 11/2004 | Lemelson | B60R 25/305 |
| | | | 382/118 |
| 2019/0213816 A1* | 7/2019 | Grigorov | G06V 40/174 |
| 2021/0097304 A1* | 4/2021 | Agrawal | G06V 10/25 |
| 2022/0219643 A1* | 7/2022 | Hanson | G06V 40/172 |

FOREIGN PATENT DOCUMENTS

| | | |
|---|---|---|
| KR | 1020210066219 A | 6/2021 |
| WO | 2020038140 A1 | 2/2020 |

OTHER PUBLICATIONS

Farhi et al., "Smart Identity Management System by Face Detection Using Multitasking Convolution Network", Hindawi, Security and Communication Networks, vol. 2021, Article ID 7314823, 11 pages, https://doi.org/10.1155/2021/7314823.

* cited by examiner

*Primary Examiner* — Wassim Mahrouka
(74) *Attorney, Agent, or Firm* — Frank Lollo; Brooks Kushman P.C.

(57) ABSTRACT

A computer includes a processor and a memory, the memory stores instructions executable by the processor to generate a first cropped image by applying a first cropping operation to a captured image, in which the first cropping operation is selected based on a first component to be actuated. The instructions can additionally be to apply a live person image recognition algorithm to the first cropped image to determine whether a recognized person is represented in the first cropped image and to output a signal to initiate actuation of the first component in response to the live person image recognition algorithm responsive to determining that the recognized person is in the first cropped image and is permitted to actuate the first component.

20 Claims, 4 Drawing Sheets

115

105

125

102

COMM. MODULE 114

HMI 112

COMPONENTS 110

COMPUTER 104

NON-CAMERA SENSORS 108

106

100

400

ACTUATING A SYSTEM VIA LIVE PERSON IMAGE RECOGNITION

BACKGROUND

Systems are often equipped with cameras, which can facilitate observation of an environment external to the system as well as areas internal to the system. For example, in a system that includes a vehicle, a facial recognition system, operating under the control of a vehicle computer, can compare parameters of a captured image of the facial and/or other features of a person, who may be attempting to enter the vehicle, operate the vehicle, etc., with a set of stored parameters to determine whether the person is authorized to do so.

DETAILED DESCRIPTION

Figure 1:
FIG. 1 is a block diagram of an example vehicle.

This disclosure provides techniques for accessing components of a system, such as a vehicle, via live person image recognition prior to permitting a person to actuate or control the component. In example implementations, images of a live person's facial and/or other features, e.g., the live person's shoulders, may be utilized in an image recognition process to biometrically identify the person, thereby determining whether the person is authorized to access and/or exercise control over the vehicle component. Operation of a vehicle component may include actuation of a door lock, accessing and/or controlling ignition of the vehicle, controlling propulsion, controlling steering of the vehicle, controlling an adjusting component of a seat, accessing a climate-control component, modifying an infotainment setting, and/or accessing a human-machine interface (HMI). In this context, a "live person image recognition process" means a process by which features of a person's face and/or other portions of the person are compared with a set of stored live person image parameters, and/or parameters relating to other portions of the person, e.g., the person's shoulders, to permit a computer of the vehicle to identify the person. In some instances, prior to obtaining access to the vehicle based on recognition of an image of a person, the person may participate in an enrollment process. That is, persons may be authenticated to access a system or components thereof based on whether they can be verified to have been enrolled. In an enrollment process, a camera of the vehicle may capture and store images of a person's facial and/or other features from various angles, which allows an onboard vehicle computer to recognize the person's facial and/or other features at various orientations of the person's features with respect to the camera.

However, in an example situation, such as may be encountered when a person is attempting to unlock a vehicle door utilizing facial recognition, multiple individuals positioned within the field-of-view of a camera mounted near the vehicle door may result in the vehicle facial recognition system attempting to execute recognition utilizing facial and/or other features of a person who has not been enrolled.

For example, a person holding a child may initiate a facial recognition process in which the vehicle computer attempts to execute facial recognition utilizing an image of the child's facial features rather than the facial features of the person holding the child. In another example, an authorized operator, i.e., a person authorized to actuate or control ignition of the vehicle, may be seated in a driver's position of the vehicle along with another person seated in the vehicle's rear seat. In such an instance, a vehicle computer receiving images from a dashboard-mounted camera may deny access to the vehicle's ignition component based on facial recognition of the person seated in the rear seat, who may not be enrolled as a person authorized to actuate or control the vehicle's ignition. In some instances, in response to multiple occurrences of the unsuccessful attempts by the vehicle computer to identify an enrolled person, the vehicle may implement a "lockout counter," which prohibits any person from actuating a vehicle component, such as, e.g., controlling an unlocking mechanism of a vehicle door, controlling ignition of the vehicle, etc., for a predetermined duration.

Thus, as disclosed herein, the vehicle computer may advantageously select a cropping operation to be applied to images of a live person's facial and/or other features, e.g., the live person's shoulders, present in a scene captured by a vehicle camera. In this context, a cropping operation means removal or adjustment of an image of a scene that excludes one or more areas of the scene, so as to direct a process of identifying a live person within the adjusted image via the person's facial and/or other features. Any suitable cropping operation or technique can be applied to an image of a captured scene. Such operations can include a histogram of gradients (e.g., to enumerate occurrences of gradient orientation in localized portions of an images of the scene), Haar cascading (e.g., to detect objects in images, irrespective of their scale in image and location), Retinaface (e.g., to detect and localize two-dimensional facial landmarks utilizing three-dimensional vertices regression), and YuNet (e.g., utilizing a classification network to apply convolution blocks followed by MaxPool down sampling to encode an input image into multi-level feature representations). The cropping operation can be based on a component of the vehicle that the person is attempting to access, actuate, and/or control. For example, based on an enrolled person attempting to gain entry to the vehicle, programming of the vehicle computer can select a cropping operation that directs facial recognition processing toward the area of the scene occupied by the largest face in the scene, thereby guiding image processing operations towards the direction of the person closest to the vehicle camera. In another example, based on detection of a person seated in the driver's position of the vehicle, the vehicle computer can select a cropping operation that directs facial recognition programming to process an image within the scene that is occupied by the person having the least-obstructed shoulders. Accordingly, image processing operations may be directed toward the person seated in the driver's position of the vehicle while excluding others who may be positioned in a rear seat of the vehicle. Other examples of cropping operations that can be performed based on the vehicle components selected for actuation are described herein.

In this context, facial and/or other features of a live person can be determined to be consistent with facial and/or other features of an enrolled person in response to measured parameters of the live person deviating from parameters of the enrolled live person by less than a threshold amount. Thus, for example, extracted facial and/or nearby features of a live person positioned, for example, in front of a door of the vehicle may be determined to be consistent with those of an enrolled person in response to use of any suitable facial image processing technique(s) to analyze an image of a live person's face presented to a camera. In an example, image processing programming may map and/or extract facial geometry and/or facial expressions of a live person. Mapping and/or extraction of facial geometry and/or facial expressions can include identification of facial landmarks utilized to distinguish a live person's face from other objects. Facial recognition algorithms may utilize a distance between landmarks identified in an image such as the eyes of a live person, a distance from the forehead to the chin of a live person, a distance between the nose and the mouth of a live person, depth of a live person's eye sockets, shape of cheek bones, and/or contour of the lips, cars, and chin of a live person. Such distances, geometrical factors (and/or ratios between these) of a live person's face may be compared with corresponding features and/or geometrical factors of an enrolled person to determine whether the distances and/or geometrical factors deviate by a threshold amount, e.g., less than 5%, less than 10%, etc. Alternatively, or in addition, consistency between facial and/or other features of a live person and those of an enrolled person may be determined utilizing any suitable technique, such as a histogram of oriented gradients, and/or techniques that utilize a convolutional neural network. In response to a live person image recognition process, programming of a vehicle computer may be executed to assign a score, described further hereinbelow, which indicates a measure of similarity between facial features of a live person and an enrolled person.

Although examples herein include techniques for accessing a vehicle via access or control a variety of non-vehicle systems, such as systems for providing access to a building and/or restricted areas within a building, payment for goods and/or services, access to machinery, etc.

In an example, a system can include a computer including a processor coupled to a memory, the memory storing instructions including instructions executable by the processor to generate a first cropped image by applying a first cropping operation to a captured image, wherein the first cropping operation is selected based on a first component to be actuated, to apply a live person image recognition algorithm to the first cropped image to determine whether a recognized person is represented in the first cropped image, and to output a signal to initiate actuation of the first component in response to the live person image recognition algorithm responsive to determining that the recognized person is in the first cropped image and is permitted to actuate the first component.

The first cropping operation can include removing a portion of the captured image outside of an area that includes a largest area of facial features of the recognized person.

The first cropping operation can include removing a portion of the captured image outside of a central portion of the captured image that includes facial features of the recognized person.

The first cropping operation can include removing a portion of the captured image outside of facial features and least-obstructed shoulders of the recognized person.

The live person image recognition algorithm can include comparing a person represented in the first cropped image with image parameters of a most recent user of the system.

The first component can be a component in a vehicle.

The instructions can further include instructions to independently apply the live person image recognition algorithm to the first cropped image and to a second cropped image generated by applying a second cropping operation to the captured image, and to determine a sum of weighted scores for the first cropped image and the cropped image.

The first component can be a door lock.

The first component can be a seat.

The first component can be a climate control.

The first component can be an infotainment component.

The first component can be a propulsion component of a vehicle.

The instructions can further include instructions to increment a lockout counter in response to applying multiple occurrences of the live person image recognition algorithm.

The instructions can further include instructions to select a second cropping operation for application to a second captured image to control a second component of the system, to apply the live person image recognition algorithm to determine whether the recognized person is represented in the captured image cropped by the second cropping operation, and to actuate the second component in response to the live person image recognition algorithm determining that the recognized person is permitted to actuate the second component.

In an example, a method can include generating a first cropped image by applying a first cropping operation to a captured image, wherein the first cropping operation is selected based on a first component to be actuated, applying a live person image recognition algorithm to the first cropped image to determine whether a recognized person is represented in the first cropped image, and generating an output a signal to initiate actuation of the first component in response to the live person image recognition algorithm responsive to determining that the recognized person is in the first cropped image and is permitted to actuate the first component.

The method can further include incrementing a lockout counter in response to applying multiple occurrences of the live person image recognition algorithm.

The first component can be a door lock.

The first component can be a seat.

The first component can be a propulsion component.

The first component can be a component in a vehicle.

FIG. 1 is a block diagram of an example vehicle system 100. As seen in FIG. 1, system 100 includes vehicle 102, which includes computer 104 that is communicatively coupled via an internal communications network, such as vehicle network 106, to various elements including cameras 105, 115, and 125, as well as non-camera sensors 108, subsystems or components 110, such as steering components, propulsion and braking components, human machine interface (HMI) 112, and communication component 114. Vehicle computer 104 includes a processor and a memory. A memory of computer 104, such as those described herein, includes one or more forms of computer-readable media, and stores programming instructions executable by vehicle computer 104 for performing various operations, such that the vehicle computer is configured to perform the various operations, including those disclosed herein.

For example, vehicle computer 104 can be a generic computer with a processor and memory as described above and/or may include an electronic control unit (ECU) or a controller for a specific function or set of functions, and/or may include a dedicated electronic circuit including an ASIC (application specific integrated circuit) that is manufactured for a particular operation, e.g., an ASIC for processing data from camera 105 and non-camera sensors 108 and/or communicating data from cameras 105, 115, and 125, as well as non-camera sensors 108. In another example, vehicle computer 104 may include an FPGA (Field-Programmable Gate Array), which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. In some examples, a combination of processor(s), ASIC(s), and/or FPGA circuits may be included in computer 104. Further, vehicle computer 104 could include a plurality of computers 104 onboard vehicle 102, e.g., a plurality of ECUs (electronic control units) or the like, operating together to perform operations ascribed herein to vehicle computer 104.

The memory accessible by computer 104 can be of any type, e.g., hard disk drives, solid state drives, servers, or any volatile or non-volatile media. The memory can store the collected data sent from camera 105 and non-camera sensors 108. The memory can be a separate device from computer 104, and computer 104 can retrieve information stored by the memory via a communication network in the vehicle such as vehicle network 106, e.g., over a controller area network (CAN) bus, a local interconnect network (LIN) bus, a wireless network, etc. Alternatively or additionally, the memory can be part of computer 104, e.g., as a memory of computer 104.

Computer 104 can include programming in the form of executable instructions, which operate one or more components 110, such as components of vehicle brakes, propulsion (e.g., one or more of an internal combustion engine, electric motor, hybrid engine, etc.), steering, climate control, interior and/or exterior lights, etc., as well as to determine whether and when computer 104, as opposed to a human operator, is to control such operations. Computer 104 may include or be communicatively coupled to, e.g., via vehicle network 106, such as a communications bus as described further below, more than one processor, e.g., included in components 110 such as non-camera sensors 108, electronic control units (ECUs) or the like included in the vehicle for monitoring and/or controlling various vehicle components, e.g., a powertrain controller, a brake controller, a steering controller, etc.

Computer 104 is generally arranged for communications on vehicle network 106, which can include a communications bus in the vehicle, such as a CAN bus or the like, and/or other wired and/or wireless mechanisms. Vehicle network 106 is a communications network via which messages can be exchanged between various devices, e.g., camera 105, non-camera sensors 108, components 110, computer 104(*s*), etc., onboard vehicle 102. Computer 104 can be generally programmed to send and/or receive, via vehicle network 106, messages to and/or from other devices in vehicle, e.g., any or all of ECUs, camera 105, non-camera sensors 108, actuators, components 110, communications component 114, human machine interface (HMI) 112, etc. For example, various component 110 subsystems (e.g., components 110 can be controlled by respective ECUs) and/or non-camera sensors 108 may provide data to computer 104 via vehicle network 106.

Non-camera sensors 108 may correspond to a device(s) that can obtain one or more measurements of one or more physical phenomena. Some of non-camera sensors 108 may detect internal states of the vehicle, for example, wheel speed, wheel orientation, and engine and transmission variables. Some of non-camera sensors 108 may operate to detect the position or orientation of the vehicle utilizing, for example, global positioning system GPS sensors; accelerometers, such as piezo-electric or microelectromechanical systems (MEMS); gyroscopes, such as rate, ring laser, or fiber-optic gyroscopes; inertial measurements units (IMUs); and magnetometers. Some of non-camera sensors 108 may detect the external world, for example, radar sensors, scanning laser range finders, light detection and ranging (LIDAR) devices, and image processing sensors such as cameras. A LIDAR device operates to detect distances to objects by emitting laser pulses and measuring the time of flight for the pulse to travel to the object and back to the emitter.

Computer 104 may be configured for communicating through a wireless communications interface with a second vehicle, e.g., via a vehicle-to-vehicle (V2V), a vehicle-to-infrastructure (V-to-I) communication, and/or a vehicle-to-everything (V2X) communication network (i.e., communications that can include V2V and V2I). Some of non-camera sensors 108 are communications devices, for example, vehicle-to-infrastructure V2I or V2V devices, which may operate via a wireless communications network.

Communications component 114 may include elements for sending (i.e., transmitting) and receiving radio frequency (RF) communications, e.g., chips, antenna(s), transceiver(s), etc. Communications component 114 represents one or more mechanisms by which computer 104 of vehicle 102 may communicate with other vehicles, and/or elements of a communications infrastructure and may be one or more of wireless communication mechanisms, including any desired combination of wireless and wired communication mechanisms and any desired network topology (or topologies when a plurality of communication mechanisms are utilized). Exemplary V2X communication protocols include cellular, IEEE 802.11, dedicated short-range communications (DSRC), and/or wide area networks (WAN), including the Internet, providing data communication services. DSRC may have one-way or two-way short-range to medium-range wireless communication channels. A V2X communication network may have multiple channels, each identified by an identifier, e.g., channel number.

Further, in examples in which computer 104 actually comprises a plurality of devices, vehicle network 106 may be utilized to conduct communications between devices represented as computer 104 in this disclosure. For example, vehicle network 106 can include a controller area network (CAN) in which messages are conveyed via a CAN bus, or a local interconnect network (LIN) in which messages are conveyed via a LIN bus. In some implementations, vehicle network 106 can include a network in which messages are conveyed using other wired communication technologies and/or wireless communication technologies, e.g., Ethernet, wireless fidelity (WiFi®), Bluetooth®, Ultra-Wideband, etc. Additional examples of protocols that may be used for communications over vehicle network 106 in some implementations include, without limitation, Media Oriented System Transport (MOST), Time-Triggered Protocol (TTP), and FlexRay. In some implementations, vehicle network 106 can represent a combination of multiple networks, possibly of different types, that support communications among devices in a vehicle.

Computer 104 may additionally include programming to control operations performed by camera 105, camera 115, and camera 125. Accordingly, computer 104 may execute programming to perform live person image recognition of one or more persons external to vehicle 102 and one or more persons internal to the vehicle. For example, computer 104 can execute programming to control operations of cameras 105 and 125, which may be positioned on the structures of the frame of vehicle 102, e.g., on support members that extend substantially vertically, structures located between the vehicle's front and rear windows supporting the roof of vehicle 102. However, in other examples, cameras 105 and 125 may be positioned on the roof of vehicle 102 or at any other location that provides a field-of-view of persons entering, or at least attempting to enter, vehicle 102. Computer 104 can additionally execute programming to control operations of camera 115, which may be mounted to the dashboard of vehicle 102. Camera 115 may provide a field-of-view of a person seated in a driver's position or front passenger position of vehicle 102.

In examples, cameras 105 and 125 can capture scenes for digitization and transmission to computer 104. Responsive to receipt of captured scenes, computer 104 may execute image processing in the form of live person image recognition to determine whether images within the captured scene include images of an enrolled person authorized to control or actuate, for example, unlocking of the doors of vehicle 102. Accordingly, responsive to an enrolled person presenting their face within the field-of-view of one or more of cameras 105 and 125, computer 104 may actuate an unlocking mechanism of one or more of the doors of vehicle 102, thus permitting the enrolled person to enter vehicle 102. In another example, dashboard-mounted camera 115 can capture scenes for digitization and transmission to computer 104. Responsive to receipt of captured scenes, computer 104 may execute image processing in the form of live person image recognition to determine whether images within the captured scene include images of enrolled persons authorized to control or actuate ignition, steering, and propulsion components of vehicle 102.

Cameras 105, 115, and 125 can operate to detect electromagnetic radiation in a range of wavelengths. For example, cameras 105, 115, and 125 can detect visible light, infrared radiation, ultraviolet light, or some range of wavelengths including visible, infrared, and/or ultraviolet light. For example, cameras 105, 115, and 125 can include image sensors such as charge-coupled devices (CCD), active-pixel sensors such as complementary metal-oxide semiconductor (CMOS) sensors, etc. Cameras 105 and 125 can be of sufficient resolution to digitize scenes that include facial images of live persons positioned, for example, at up to 2.0 meters from a door of vehicle 102. Camera 115 can be of sufficient resolution to digitize scenes including facial images of persons positioned in a driver's position of vehicle 102, to the right of the driver's position, and positioned in the rear seat of the vehicle.

Exemplary System Operations

Figure 2:
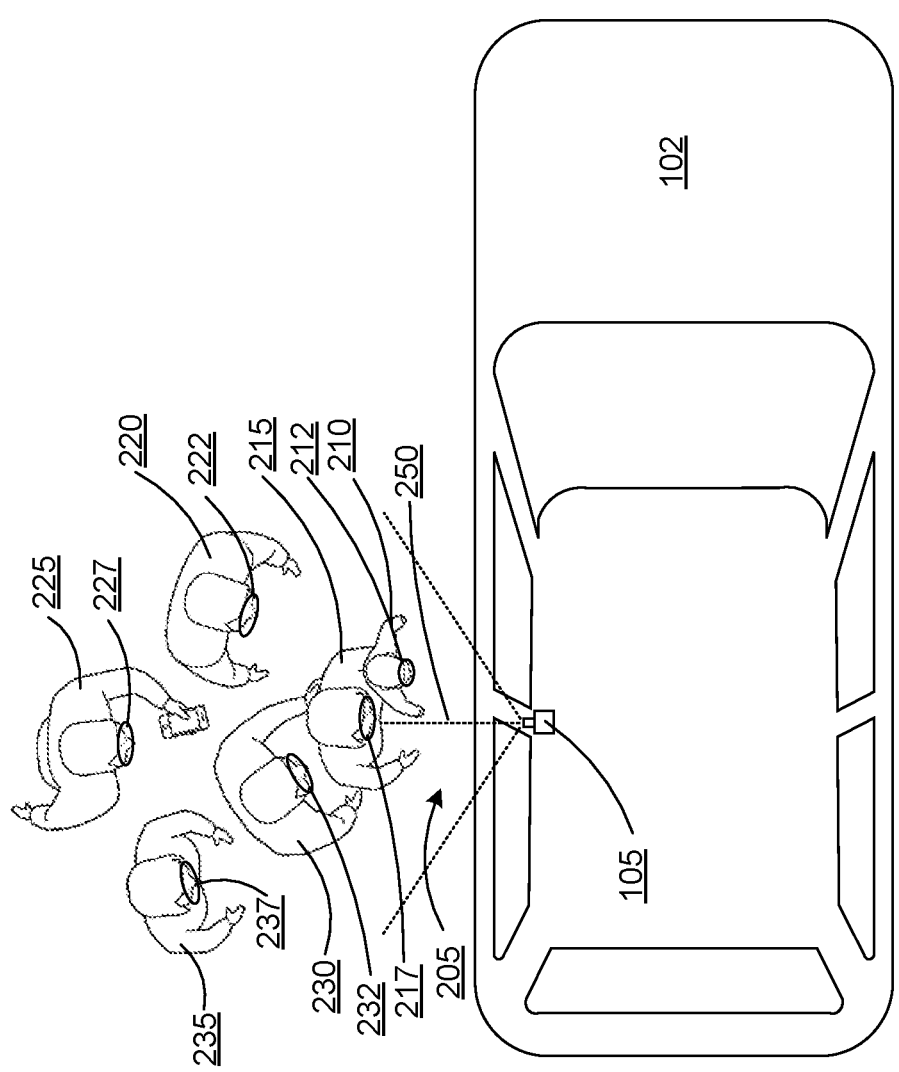
FIG. 2 depicts a top view of a group of people attempting to access a vehicle.

FIG. 2 depicts a top view 200 of a group of individuals attempting to enter vehicle 102. As seen in the example of FIG. 2, camera 105 is mounted on a vertical support structure of vehicle 102. Camera 105 is thus capable of capturing images of persons 210, 215, 220, 225, 230, and 235 positioned within field-of-view 205 of the camera, including persons who may be below or above average or typical sizes of adult males and females. Accordingly, as part of a process to enter vehicle 102, person 215 may initiate a live person image recognition process in which camera 105 captures a scene containing at least partial images of persons 215-235. However, as part of the live person image recognition process, camera 105 may capture a scene that includes images of persons 210-235. Accordingly, image processing programming of computer 104 may attempt to perform live person image recognition by extracting facial and/or other parameters of persons 210-235, all of whom may be at least partially visible to camera 105. In an example, image processing to extract facial and/or other parameters of persons 210-235 may utilize any suitable facial recognition algorithm to identify facial landmarks to distinguish a live person's face from other objects. Facial recognition algorithms may determine a distance between the eyes of a live person, a distance from the forehead to the chin of a live person, a distance between the nose and the mouth of a live person, depth of a live person's eye sockets, shape of cheek bones, and/or contour of the lips, cars, and chin of persons 210-235. Such distances, geometrical factors (and/or ratios between these) of the faces of persons 210-235 may be compared with corresponding features and/or geometrical factors of an enrolled person to determine whether the distances and/or geometrical factors deviate by a threshold amount, e.g., less than 5%, less than 10%, etc. Deviation by less than the threshold amount can result in computer 104 determining that one or more of persons 210-235 corresponds to an enrolled individual. Alternatively, or in addition, consistency between facial and/or other features of one or more of persons 210-235 and those of an enrolled person may be determined utilizing other suitable techniques, such as a histogram of oriented gradients, and/or techniques that utilize a convolutional neural network. Accordingly, programming of computer 104 may, for example, sequentially compare the extracted facial parameters and/or other parameters, e.g., the shoulders, of persons 210-235 to determine whether the parameters of the captured image of at least one of the persons corresponds to the facial and/or other parameters of an enrolled person authorized to control or actuate a door lock of vehicle 102.

In an example, programming of computer 104 can apply a cropping operation to a captured scene within field-of-view 205 prior to initiating a facial recognition process. Thus, for example, programming of computer 104 can crop images that include facial and/or other features of persons 210-235. In an example, computer 104 may crop images present in the captured scene corresponding to the largest face visible to camera 105. In this context, the largest area of facial features within field-of-view 205 of camera 105 means the face and/or other features determined by computer 104 to include the largest number of pixels in any direction. Accordingly, as seen in the example of FIG. 2, responsive to person 215 including facial features larger than those of person 210 (a child), image processing programming of computer 104 may execute a cropping operation to provide an image that includes the facial features of person 210. A cropping operation executed by computer 104 may be followed by applying a facial recognition technique to determine whether person 215 represents an enrolled person authorized to actuate or control an unlocking mechanism of a door lock of vehicle 102.

In another example, programming of computer 104 may crop images present in the captured scene to remove portions outside of an area of the face of a person positioned within at a central portion with respect to camera 105. In this context, a central portion with respect to camera 105 corresponds to an area intersected by optical axis 250 of camera 105. Accordingly, as seen in the example of FIG. 2, responsive to person 215 being positioned along optical axis 250 of camera 105, a cropping operation can remove images of the captured scene outside of cropped image 217. Removal of images of the captured scene outside of cropped image 217 can queue image processing programming of computer 104 to apply a facial recognition technique to the cropped image to determine whether person 215 represents an enrolled person authorized to actuate or control an unlocking mechanism of a door lock of vehicle 102.

In another example, computer 104 may perform facial recognition in response to applying, independently of one another, two or more cropping operations to determine whether a person positioned within field-of-view 205 of camera 105 is authorized to control or actuate, for example, an unlocking mechanism of a door of vehicle 102. For example, image processing programming of computer 104 can execute a cropping operation to provide an image that includes the largest area of facial features in a captured scene, and, in addition, to remove portions outside of an area of the facial features positioned within the central portion of the scene with respect to camera 105. Computer 104 may then independently apply a facial recognition process to each cropped image and compute a weighted sum of scores that result from such operations. In an example, a facial recognition algorithm may compute a score, which may be expressed in the form of a probability, e.g., between 0% and 100%, that facial features of a person correspond to those of an enrolled person. Application of two or more facial recognition processes, applied independently to each of two or more cropped images of a scene, may enhance the facial recognition capability of the programming of computer 104. In computing a weighted sum, programming of computer 104 may assign an increased weight to a computed score in response to a facial recognition process determining that parameters extracted from an image correspond or at least approximate, e.g., within 10%, 5%, etc., to those of a recent, or most recent, enrolled person that has accessed vehicle 102. Thus, for example, a first facial recognition process may result in a computed score that indicates an 80% probability that the facial features of a person correspond to the most recent enrolled person to have accessed vehicle 102. A second facial recognition process may result in a computed score that indicates a 90% probability that the facial features of the person correspond to those of a person other than the most recently enrolled person to access the vehicle. Programming of computer 104 may then apply a weighting factor greater than 1.0, e.g., 1.1, 1.2, 1.25, etc., so as to add to the probability score of the most recently enrolled person. Application of a weighting factor greater than 1.0 may operate to predispose the facial recognition process to select the most recent enrolled person to have accessed vehicle 102 over other persons.

In an example, weighting factors may operate to prioritize a cropped image of a scene that includes the largest area of facial features over a cropped image of a scene that includes facial features of a person positioned along optical axis 250 of a camera (e.g., 105, 125). In an example, a cropped image of a scene that includes facial features of a person positioned along optical axis 250 of a camera (e.g., 105, 125) may be prioritized over a cropped image that includes facial features of a most recent user of vehicle 102. In an example, a cropped image of a scene that includes facial features of a most recent user of vehicle 102 may be prioritized over a cropped image of a person having the least-obstructed shoulders. In an example, a cropped image of a scene of a person having the least-obstructed shoulders may be prioritized over a cropped image of a scene of a person having a head pose angle directed away from a camera (e.g., 105, 125). In another example, programming of computer 104 can apply additional cropping operations to form cropped images that include the facial features of all persons within field-of-view 205, e.g., persons 210, 215, 220, 225, 230, and 235 to form cropped images 212, 217, 222, 227, 232, and

237. Cropping operations may be followed by image processing of computer 104 applying a facial recognition technique to determine whether any person, e.g., 210-235, within field-of-view 205, represents an enrolled person authorized to actuate or control an unlocking mechanism of a door lock of vehicle 102. In an example such cropping operations, applied to multiple persons in a single scene captured via a camera 105, bring about a single increment toward computer 104 implementing a lockout counter of vehicle 102.

Figure 3:
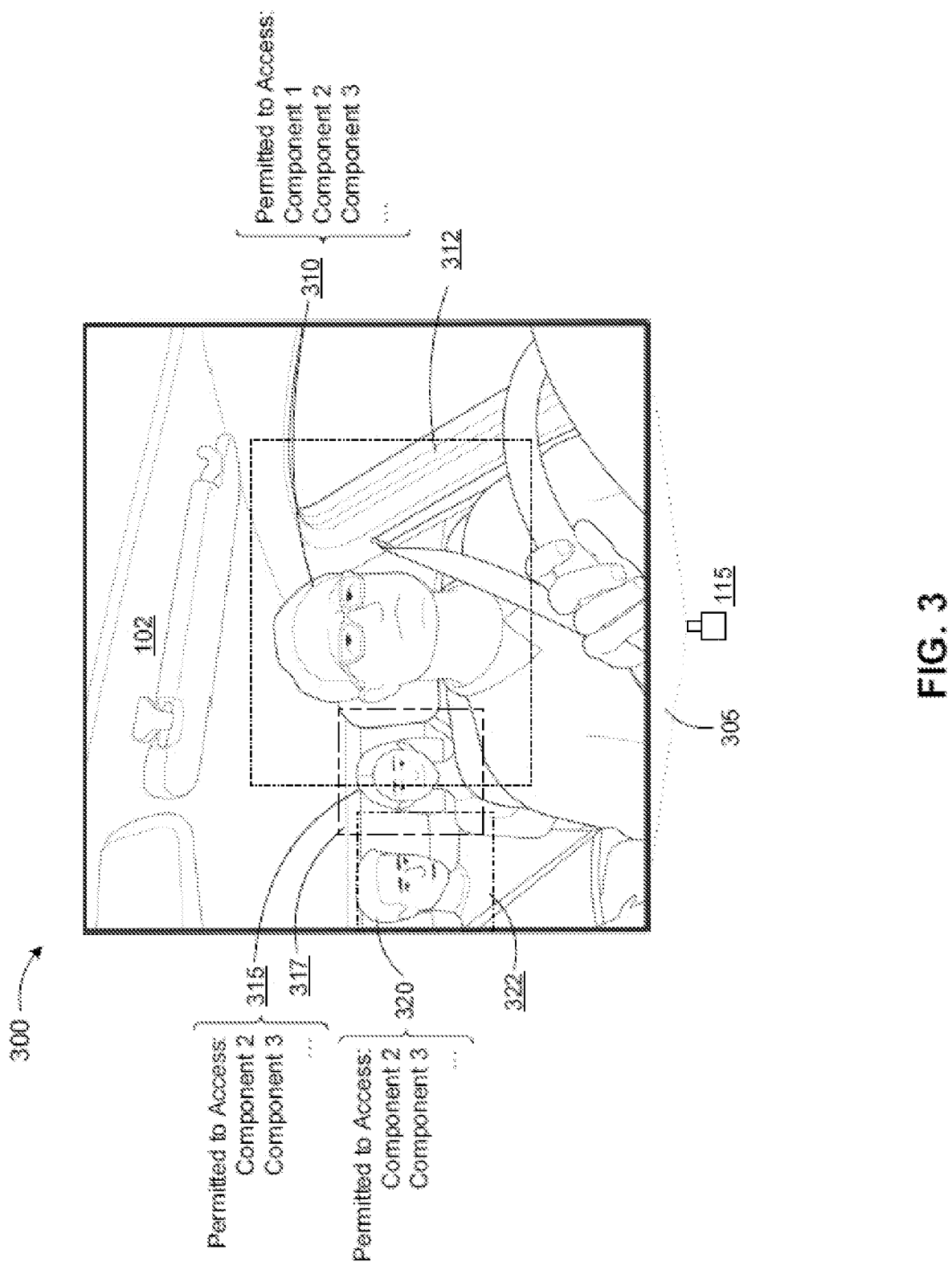
FIG. 3 depicts people positioned within a field-of-view of a vehicle internal camera.

FIG. 3 depicts scene 300 within field-of-view 305 of dashboard-mounted camera 115 of vehicle 102. Dashboard-mounted camera 115 is capable of capturing images of person 310, seated in the driver's position of vehicle 102, and images of persons 315 and 320, who are seated in the rear seat of vehicle 102. Person 310 and persons 315 and 320 can represent enrolled persons authorized to access one or more components of vehicle 102. Thus, for example, person 310 seated in the driver's position of vehicle 102, may be permitted to control or actuate ignition and/or propulsion of vehicle 102 (e.g., component 1), controlling an infotainment component of vehicle 102 (e.g., component 2), and controlling a climate control setting of vehicle 102 (e.g., component 3), to actuate or adjust a driver's seat position, etc. Persons seated in the rear seat of vehicle 102 may be permitted to control or actuate, for example, fewer vehicle components than person 310 such as, for example an infotainment component of vehicle 102 (e.g., component 2) and a climate control setting (e.g., component 3) of vehicle 102.

However, prior to executing facial recognition to identify persons 310, 315, and 320, programming of computer 104 may execute a cropping operation based on the positions of persons 310, 315, and 320. Responsive to a cropping operation, computer 104 may determine whether the person, e.g., 310, 315 and 320, represents an enrolled person authorized to control or actuate a vehicle component.

In the example of FIG. 3, responsive to detecting persons 310, 315, and 320 being seated within vehicle 102, computer 104 may execute cropping operations to determine which of the persons represents the person located in the driver's position of the vehicle. In an example, image processing programming of computer 104 may perform a cropping operation to determine the person having the least-obstructed shoulders in field-of-view 305. Accordingly, for example, image processing programming of computer 104 may execute a cropping operation to remove areas outside of the facial features, neck, and shoulders of each of persons 310, 315, and 320. Thus, in a first cropping operation, indicated via cropped image 322, programming of computer 104 may determine that portions of person 320, seated in the rear seat of vehicle 102, appears to have a significant portion of both right and left shoulders obstructed from the view of camera 115. Similarly, in a second cropping operation, resulting in cropped image 317, programming of computer 104 may determine that portions of person 315 appear to have a right shoulder visible while the left shoulder is obstructed from the view of camera 115. Similarly, in a third cropping operation, indicated via cropped image rectangle 312, programming of computer 104 may determine that both right and left shoulders of person 310 are visible within the view of camera 115.

Accordingly, such as in the example of FIG. 3, person 310 may be determined to be seated in the driver's position of vehicle 102 responsive to programming of computer 104 determining that person 310 presents the least-obstructed shoulders of the persons within the field-of-view of camera 115. In addition, the head pose of person 310, oriented in a forward direction relative vehicle 102, may assist in determining that person 310 is seated in the driver's position.

In an example, programming of computer 104 determining that person 310 is seated in the driver's position of vehicle 102, the computer may execute a facial recognition technique to determine whether person 310 represents an enrolled person permitted to operate vehicle 102. In response to programming of computer 104 determining that person 310 represents a person enrolled as an authorized operator of the vehicle, computer 104 may permit the person to control or actuate ignition and/or propulsion of vehicle 102 (e.g., component 1), controlling an infotainment component of vehicle 102 (e.g., component 2), controlling a climate control setting of vehicle 102 (e.g., component 3), controlling a seat adjustment, etc. Conversely, in response to programming of computer 104 determining that person 310 represents a person not enrolled as an authorized operator the vehicle, computer 104 may deny person 310 from controlling or actuating propulsion. Persons seated in the rear seat of vehicle 102 may be permitted to control, for example, fewer vehicle components than person 310 such as, for example an infotainment component of vehicle 102 (e.g., component 2) and a climate control setting (e.g., component 3) of vehicle 102.

In addition, responsive to programming of computer 104 determining that persons 315 and 320 do not represent the person having the least-obstructed shoulders, persons 315 and 320 may be permitted to control a smaller number of vehicle components than those that can be controlled by person 310. Thus, for example, persons 315 and 320 may be permitted to control an infotainment component of vehicle 102 (e.g., component 2) and/or a climate control setting of vehicle 102 (e.g., component 3).

In addition to a cropping operation executed by computer 104 determining an person having the least-obstructed shoulders in a view of camera 115, a cropping operation may involve removal of a portion of the captured image outside of an area that includes a largest area of facial features of a person. For example, in place of (or in addition to) computer 104 determining both right and left shoulders of person 310 are visible to camera 115, computer 104 may crop a captured image outside of the facial features of persons 310, 315, and 320. Image processing programming of computer 104 may then determine that person 310 presents the largest area of facial features with respect to persons 315 and 320. Accordingly, computer 104 may then execute a facial recognition technique to determine whether person 310 is enrolled as an authorized operator of vehicle 102. Computer 104 may then independently apply a facial recognition process to each cropped image to compute a weighted sum that results from such operations. Application of two or more facial recognition processes, applied independently to each of two or more cropped images, may enhance the facial recognition capability of the programming of computer 104.

In response to a facial recognition technique being unsuccessful in recognizing any of persons 310, 315, and 320 as enrolled operators of vehicle 102, programming of computer 104 can increment a lockout counter, which may indicate that, for example, none of persons 310, 315, and 320 is enrolled as operators of vehicle 102. In an example, responsive to a lockout counter incrementing beyond a predetermined number, e.g., 2, 3, 4, 5, etc., ignition of vehicle 102 may be disabled for a period of time, e.g., 5 minutes, 10 minutes, 15 minutes, 30 minutes, 1 hour, 2 hours, etc.

Figure 4:
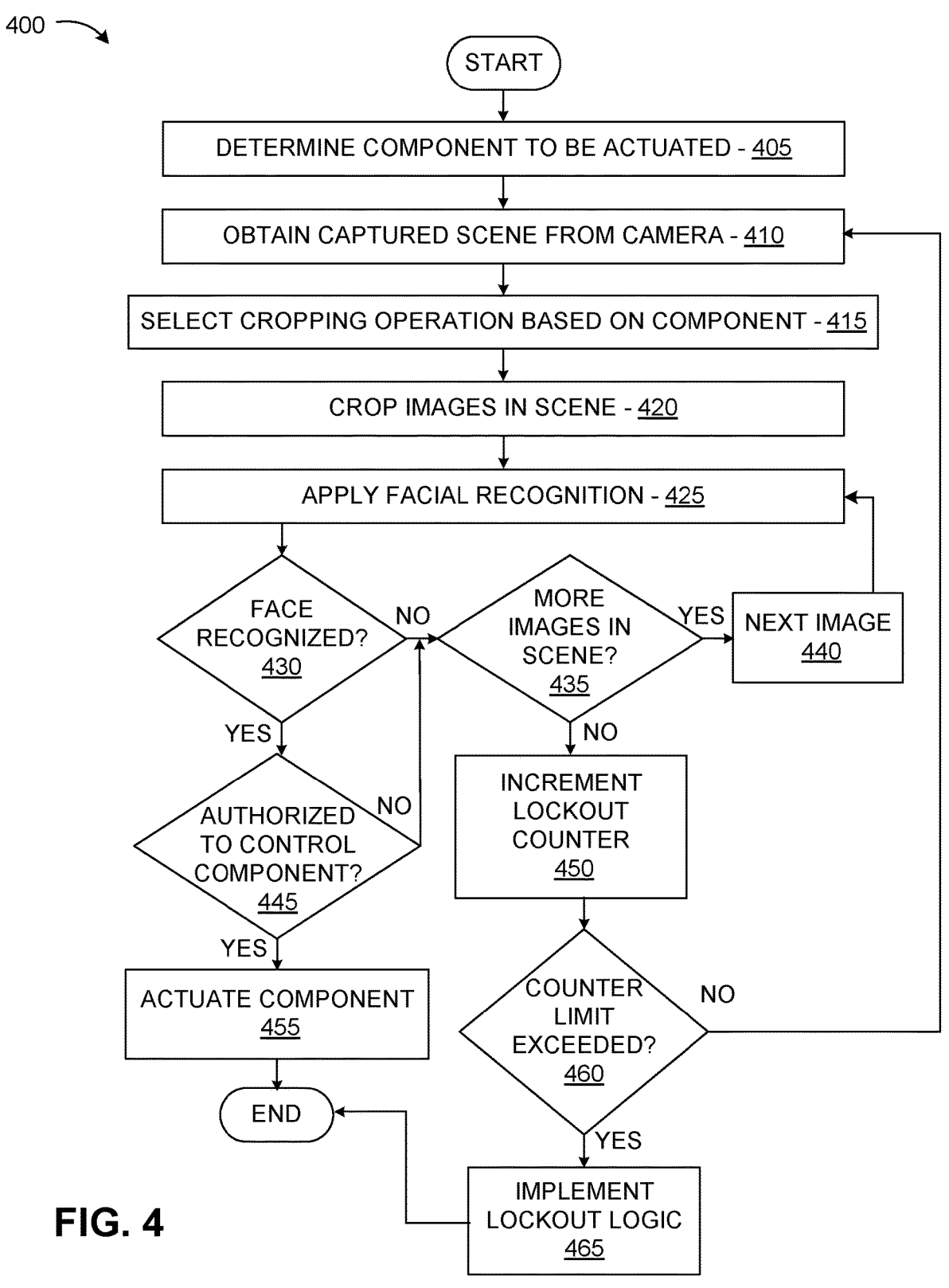
FIG. 4 is a process flow diagram of an example process for actuating a system via live person image recognition.

FIG. 4 is a process flow diagram of an example process 400 for controlling or actuating a system, e.g., a vehicle, via live person image recognition. For example, the memory of computer 104 stores executable instructions for performing the steps of process 400, and/or such programming could be implemented in other computing devices, some other non-vehicle computer, and/or other computing devices of vehicle 102. Example process 400 can be utilized to provide controlling or actuating of components of a vehicle via live person image recognition in response to persons attempting to control or actuate a door unlocking mechanism, ignition of the vehicle, or to control other vehicle functions, such as an infotainment component, a climate control component, or another vehicle component. Although process 400 is described as a vehicle-based process, it is to be understood that process 400 could be applied in the context of controlling any other system via live person image recognition, such as controlling a security system to gain access to a building or to gain access to an area within a building, controlling a retail payment system, access or control over machinery, etc.

As a general overview of vehicle-based process 400, vehicle computer 104, or a computer utilized in an application to control another system via live person image recognition, can execute programming to receive a captured scene that includes cropped images of facial and/or other features of one or more persons. In an example, computer 104 may select a cropping operation to be applied to images of facial and/or other features of persons present in a scene captured by a vehicle camera. The cropping operation can be based on a component of the vehicle that the person is attempting to control or actuate. For example, based on a person attempting to gain entry to vehicle 102, programming of computer 104 can select a cropping operation that directs facial recognition processing toward the area of the scene occupied by the largest face in the scene, thereby guiding facial recognition processes towards the direction of the person closest to a camera positioned near a door of vehicle 102 (e.g., camera 105, 125). In another example, programming of computer 104 can select a cropping operation that directs facial recognition processing toward a person positioned along an optical axis (250) of a camera near a door of vehicle 102 (e.g., camera 105, 125). In another example, computer 104 can select a cropping operation to determine the person having the least-obstructed shoulders, which can guide facial recognition processes to determine whether the person is enrolled as an authorized operator of vehicle 102.

Process 400 begins at block 405, at which computer 104 determines a component to be actuated. A component to be actuated may include an external door unlocking mechanism determined in response, for example, to detecting one or more persons approaching the vehicle. In another example, a component to be actuated may include an ignition component of the vehicle determined in response to a seat sensor registering a non-negligible weight being applied to the driver's position of a vehicle, etc.

Process 400 may continue at block 410, which can include a camera of the vehicle, such as a camera mounted near a door of vehicle 102 (e.g., on a frame member of the vehicle, a dashboard of vehicle 102, etc.), capturing an image of a scene within a camera field-of-view, e.g., 205, 305. A scene may include a portion of an environment external to vehicle 102 (e.g., within camera field-of-view 205), an interior portion of vehicle 102, (e.g., within camera field-of-view 305), etc.

Process 400 may continue at block 415, at which computer 104 can select a cropping operation based on the component to be actuated determined from block 405. For example, responsive to a component to be actuated corresponding to a vehicle door lock, computer 104 may select to apply a cropping operation that directs facial recognition processing toward the area of a scene (e.g., 205) that includes the largest facial features visible within the scene, an area that includes facial features at a central portion of the scene, an area that includes the facial features and least-obstructed shoulders within the scene, an area that includes facial features that intersect an optical axis (e.g., optical axis 250) of a camera (e.g., camera 105, 125). In another example, responsive to a component to be actuated corresponding to a vehicle ignition system, computer 104 may select to apply a cropping operation that directs facial recognition processing toward the area of a scene that includes the largest facial features visible within the scene, an area that includes the facial features and least-obstructed shoulders within the scene captured by a camera (e.g., camera 115).

Process 400 may continue at block 420, at which computer 104 executes image processing programming to apply cropping operations to images within the scene. Image cropping operations may be in accordance with any suitable technique for analyzing and detecting features, and extracting salient information from image data. Such techniques can include a histogram of gradients (e.g., to enumerate occurrences of gradient orientation in localized portions of an images of the scene), Haar cascading (e.g., to detect objects in images, irrespective of their scale in image and location), Retinaface (e.g., to detect and localize two-dimensional facial landmarks utilizing three-dimensional vertices regression), and YuNet (e.g., utilizing a classification network to apply convolution blocks followed by MaxPool down sampling to encode an input image into multi-level feature representations).

Process 400 may continue at block 425, at which computer 104 can analyze a cropped image obtained in block 420 to determine consistency between the facial and/or other features of a person attempting to actuate or control a component of vehicle 102 and an enrolled person. Consistency between the facial and/or other features of a live person attempting to actuate or control a component and an enrolled person can be determined in response to measured parameters of image of the live person deviating from parameters of the enrolled person by less than a threshold amount. Thus, for example, extracted facial and/or nearby features of a live person positioned, for example, in front of a door of the vehicle may be determined to be consistent with those of an enrolled person in response to a measured distance between the eyes of the live person, a measured distance between a point that is equidistant between the eyes and the nose of the live person, and/or a measured distance between the eyes and the mouth of the live person, etc., deviating from corresponding features of an enrolled person by, for example, less than 5%, less than 10%, etc. Alternatively, or in addition, consistency between facial and/or other features of a live person and those of an enrolled person may be determined utilizing any suitable technique, such as a histogram of oriented gradients, and/or techniques that utilize a convolutional neural network.

Block 425 can include programming of computer 104 by sequentially analyzing images of facial and other features of one or more persons external to vehicle 102 (e.g., 210, 215, 220, 225, 230, 235) or internal to vehicle 102 (e.g., 310, 315, 320). In a facial recognition process, features of a live person can be determined to be consistent with those of an enrolled person in response to a measured distance between the eyes of the person, a measured distance between a point that is equidistant between the eyes and the nose of the person, and/or a measured distance between the eyes and the mouth of the person, etc. In an example, facial recognition techniques may involve any suitable technique, such as a histogram of oriented gradients, and/or techniques that utilize a convolutional neural network.

Process 400 may continue at block 430, at which programming of computer 104 determines whether facial and/or other features of a live person are consistent with those of an enrolled person. In an example, consistency can be determined in response to facial features of a live person deviating from corresponding features of an enrolled person by, less than a threshold amount, such as less than 5%, less than 10%, etc. Alternatively, or in addition, consistency between facial and/or other features of a live person and an enrolled person can be determined utilizing any suitable technique, such as a histogram of oriented gradients, and/or techniques that utilize a convolutional neural network.

Responsive to application of a facial recognition technique, process 400 may continue at block 430, at which programming of computer 104 determines whether the facial features of one or more images of a live person deviate from those of an enrolled person by greater than a threshold amount such as, for example, 5%, 10%, etc. Responsive to computer 104 determining that the facial features of a live person in a cropped image are consistent with those of an enrolled person, process 400 may continue at block 445, at which computer 104 determines whether the person is authorized to control or actuate a component of vehicle 102. In an example, a person recognized as an authorized operator of vehicle 102, may be permitted to actuate an ignition component, e.g., an ignition switch. In another example, a person recognized as an enrolled non-driver of vehicle 102 may be permitted to actuate or control a door lock of the vehicle, actuate or control an adjustment of a seat of vehicle 102, actuate or control a climate control setting, etc.

Process 400 may continue at block 455, at which vehicle 102 actuates the component authorized for activation at block 445.

After block 455, process 400 ends.

Returning briefly to block 430, responsive to computer 104 determining that the facial features of a live person in a cropped image are not consistent with those of an enrolled person, process 400 may continue at block 435, at which computer 104 determines whether more cropped images are present in the field-of-view (e.g., 205, 305) of a captured scene. Process 400 may then continue at block 440, in which programming of computer 104 proceeds to another cropped image of a person (e.g., 210, 215, 220, 225, 230, 235 310, 315, 320) visible in the field-of-view (e.g., 205, 305) of a captured scene. Programming of computer 104 may then apply a facial recognition technique to a second cropped image in the camera field-of-view (e.g., 205, 305).

In response to the determination at block 435 that no more cropped images (e.g., 212, 217, 222, 227, 232, 237, 312, 319, 322) are present in the scene, process 400 may continue at block 450, at which programming of computer 104 may increment a lockout counter. In an example, the lockout counter may be incremented responsive to determination that no cropped images of a captured scene include facial images of persons enrolled as being permitted to actuate the vehicle component.

Process 400 may continue at block 460, at which programming of computer 104 determines whether the lockout counter has exceeded an upper limit, e.g., 2, 3, 4, 5, etc. At block 460, multiple occurrences of a facial recognition technique, applied in response to a corresponding number of cropping operations, may increment the lockout counter.

In response to the current value of the lockout counter being less than the lockout counter limit, process 400 may continue at block 410, at which a vehicle camera (e.g., 105, 115, 125) can capture an additional scene, such as scenes within camera field-of-view 205, 305.

In response to the current value of the lockout counter being greater than the lockout counter limit, process 400 may continue at block 465, at which computer 104 may implement lockout logic, which may deny a person from accessing or actuating a component of vehicle 102 for a predetermined period of time (e.g., 5 minutes, 10 minutes, 30 minutes, 1 hour, etc.)

After block 465, process 400 ends.

In general, the computing systems and/or devices described may employ any of a number of computer operating systems, including, but by no means limited to, versions and/or varieties of the Ford Sync® application, App-Link/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It should further be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. The adjectives "first" and "second" are used throughout this document as identifiers and are not intended to signify importance, order, or quantity. Use of "in response to" and "upon determining" indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A system comprising:

a computer including a processor coupled to a memory, the memory storing instructions including instructions executable by the processor to:

generate a first cropped image by applying a first cropping operation to a captured image, wherein the first cropping operation is selected based on a selection of a first component to be actuated from a plurality of components;

apply a live person image recognition algorithm to the first cropped image to determine whether a recognized person is represented in the first cropped image; and output a signal to initiate actuation of the first component in response to the live person image recognition algorithm responsive to determining that the recognized person is in the first cropped image and is permitted to actuate the first component.

2. The system of claim 1, wherein the first cropping operation includes removing a portion of the captured image outside of an area that includes a largest area of facial features of the recognized person.

3. The system of claim 1, wherein the first cropping operation includes removing a portion of the captured image outside of a central portion of the captured image that includes facial features of the recognized person.

4. The system of claim 1, wherein the first cropping operation includes removing a portion of the captured image outside of facial features and least-obstructed shoulders of the recognized person.

5. The system of claim 1, wherein the live person image recognition algorithm includes comparing a person represented in the first cropped image with image parameters of a most recent user of the system.

6. The system of claim 1, wherein the first component is a component in a vehicle.

7. The system of claim 1, wherein the instructions further include instructions to:

independently apply the live person image recognition algorithm to the first cropped image and to a second cropped image generated by applying a second cropping operation to the captured image; and determine a sum of weighted scores for the first cropping operation and the second cropping operation.

8. The system of claim 1, wherein the first component is a door lock.

9. The system of claim 1, wherein the first component is a seat.

10. The system of claim 1, wherein the first component is a climate control.

11. The system of claim 1, wherein the first component is an infotainment component.

12. The system of claim 1, wherein the first component is a propulsion component of a vehicle.

13. The system of claim 1, wherein the instructions further include instructions to: increment a lockout counter in response to applying multiple occurrences of the live person image recognition algorithm.

14. The system of claim 1, wherein the instructions further include instructions to:

select a second cropping operation for application to a second captured image to control a second component of the system;

apply the live person image recognition algorithm to determine whether the recognized person is represented in the second captured image cropped by the second cropping operation; and actuate the second component in response to the live person image recognition algorithm determining that the recognized person is permitted to actuate the second component.

15. A method comprising:

generating a first cropped image by applying a first cropping operation to a captured image, wherein the first cropping operation is selected based on a selection of a first component to be actuated from a plurality of components;

applying a live person image recognition algorithm to the first cropped image to determine whether a recognized person is represented in the first cropped image; and outputting a signal to initiate actuation of the first component in response to the live person image recognition algorithm responsive to determining that the recognized person is in the first cropped image and is permitted to actuate the first component.

16. The method of claim 15, further comprising:

incrementing a lockout counter in response to applying multiple occurrences of the live person image recognition algorithm.

17. The method of claim 15, wherein the first component is a door lock.

18. The method of claim 15, wherein the first component is a seat.

19. The method of claim 15, wherein the first component is a propulsion component.

20. The method of claim 15, wherein the first component is a component in a vehicle.

* * * * *